United States Patent
Chao

(10) Patent No.: US 12,389,183 B2
(45) Date of Patent: Aug. 12, 2025

(54) PLAYER DEVICE AND ASSOCIATED SIGNAL PROCESSING METHOD

(71) Applicant: Realtek Semiconductor Corp., HsinChu (TW)

(72) Inventor: Ying-Ying Chao, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 166 days.

(21) Appl. No.: 18/525,814

(22) Filed: Nov. 30, 2023

(65) Prior Publication Data

US 2024/0196149 A1 Jun. 13, 2024

(30) Foreign Application Priority Data

Dec. 8, 2022 (TW) .................................. 111147180

(51) Int. Cl.
  *H04S 7/00* (2006.01)
  *H04N 21/43* (2011.01)
  *H04N 21/439* (2011.01)

(52) U.S. Cl.
  CPC ........... *H04S 7/30* (2013.01); *H04N 21/4302* (2013.01); *H04N 21/439* (2013.01)

(58) Field of Classification Search
  CPC . H04S 3/002; H04S 3/00; H04S 1/005; H04S 7/30; H04N 21/4302; H04N 21/439
  See application file for complete search history.

(56) References Cited

U.S. PATENT DOCUMENTS 6,535,608 B1    3/2003  Taira
8,014,534 B2 *  9/2011  Henn ...................... H04S 3/002
                                                          381/23

(Continued)

FOREIGN PATENT DOCUMENTS

DE      3640414 C2     1/2000
JP      4201153 B2 *  12/2008

OTHER PUBLICATIONS

Andrés Cabrera, "Pseudo-stereo Techniques", Csound Implementations, Retrieved from Internet: <http://www.csounds.com/journal/issue14/PseudoStereo.html#ref5>, Jan. 2, 2011.

(Continued)

*Primary Examiner* — Duc Nguyen
(74) *Attorney, Agent, or Firm* — Winston Hsu

(57) ABSTRACT

A player device includes a multi-media receiving device and a signal processing device. The signal processing device performs a mixing operation to mix a multi-media signal and a pseudo stereo signal to generate a mixed multi-media signal. The signal processing device further converts a system sound from a mono sound signal into the pseudo stereo signal by selecting at least one frequency component of the system sound as a modulation signal and combining a delayed version of the modulation signal and remaining frequency components of the system sound to generate the pseudo stereo signal. In the mixing operation, the signal processing device combines a multi-media sound component of a first channel and a system sound component of the first channel and combines a multi-media sound component of a second channel and a system sound component of the second channel to generate the mixed multimedia signal.

15 Claims, 5 Drawing Sheets

(56) References Cited

U.S. PATENT DOCUMENTS

| | | | | |
|---|---|---|---|---|
| 8,605,911 B2* | 12/2013 | Henn | ............... | G10L 25/21 |
| | | | | 381/23 |
| 2005/0053242 A1 | 3/2005 | Henn | | |
| 2010/0303245 A1* | 12/2010 | Vickers | ............... | H04S 1/005 |
| | | | | 381/17 |
| 2010/0303246 A1* | 12/2010 | Walsh | ............... | H04S 3/00 |
| | | | | 381/18 |

OTHER PUBLICATIONS

Philippe-Aubert Gauthier, "A Review and an Extension of Pseudo-Stereo for Multichannel Electroacoustic Compositions", Retrieved from Internet: <https://www.researchgate.net/publication/265155535_A_REVIEW_AND_AN_EXTENSION_OF_PSEUDO-STEREO_FOR_MULTICHANNEL_ELECTROACOUSTIC_COMPOSITIONS>, Jan. 2005.

"What is Dithering?", Retrieved from Internet: <https://www.sageaudio.com/articles/what-is-dithering>, 2023.

* cited by examiner

PLAYER DEVICE AND ASSOCIATED SIGNAL PROCESSING METHOD

BACKGROUND OF THE INVENTION

1. Field of the Invention

The present invention is related to a signal processing method, and more particularly, to a signal processing method that can effectively improve playing quality of a player device.

2. Description of the Prior Art

With popularization of digital televisions (TVs) and portable electronic devices, these electronic products have gradually become necessary equipment for users. In addition, these electronic products have been developed with more and more additional functions, such as surfing the internet, playing games, playing multi-media video, and so on. Video streaming services have flourished in response to user needs in recent years.

Video quality is an important consideration for the users when choosing products with playing capabilities. As a result, a signal processing method and an associated device that can improve playing quality based on a received signal (e.g., a video streaming signal from a video streaming service provider platform) are urgently needed to improve the user experience.

SUMMARY OF THE INVENTION

It is therefore one of the objectives of the present invention to provide a signal processing method and an associated device, to effectively improve the playing quality of a player device and further improve the user experience.

According to an embodiment of the present invention, a player device is provided, wherein the player device comprises a multi-media signal receiving device and a signal processing device. The multi-media signal receiving device is arranged to receive a multi-media signal, wherein the multi-media signal is a multi-sound channel signal, and at least comprises a multi-media sound component of a first sound channel and a multi-media sound component of a second sound signal. The signal processing device is coupled to the multi-media receiving device, and is arranged to receive the multi-media signal and perform a mixing operation to mix the multi-media signal and a pseudo stereo signal to generate a mixed multi-media signal. The signal processing device performs a stereo conversion operation upon a system sound before the mixing operation is performed, to convert the system sound into the pseudo stereo signal. In the stereo conversion operation, the signal processing device selects at least one frequency component of the system sound as a modulation signal, delays the modulation signal to generate a delayed modulation signal, and combines the delayed modulation signal and remaining frequency components of the system sound to generate the pseudo stereo signal, wherein the pseudo stereo signal at least comprises a system sound component of the first sound channel and a system sound component of the second sound channel. In the mixing operation, the signal processing device combines the multi-media sound component of the first sound channel and the system sound component of the second sound channel, to generate the mixed multi-media signal.

According to an embodiment of the present invention, a signal processing method is provided, wherein the signal processing method is arranged to generate a mixed signal of a multi-sound channel. The signal processing method comprises: receiving a multi-media signal, wherein the multi-media signal is a multi-sound channel signal, and at least comprises a multi-media sound component of a first sound channel and a multi-media sound component of a second sound signal; performing a stereo conversion operation to convert a system sound into a pseudo stereo signal; and performing a mixing operation to mix the multi-media signal and the pseudo stereo signal to generate a mixed multi-media signal. In the stereo conversion operation, the signal processing method further comprises: selecting at least one frequency component of the system sound as a modulation signal; delaying the modulation signal to generate a delayed modulation signal; and combining the delayed modulation signal and remaining frequency components of the system sound to generate the pseudo stereo signal, wherein the pseudo stereo signal at least comprises a system sound component of a first sound channel and a system sound component of a second sound channel. In the mixing operation, the signal processing method further comprises: combining the multi-media sound component of the first sound channel and the system sound component of the first sound channel and combining the multi-media sound component of the second sound signal and the system sound component of the second sound channel, to generate the mixed multi-media signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
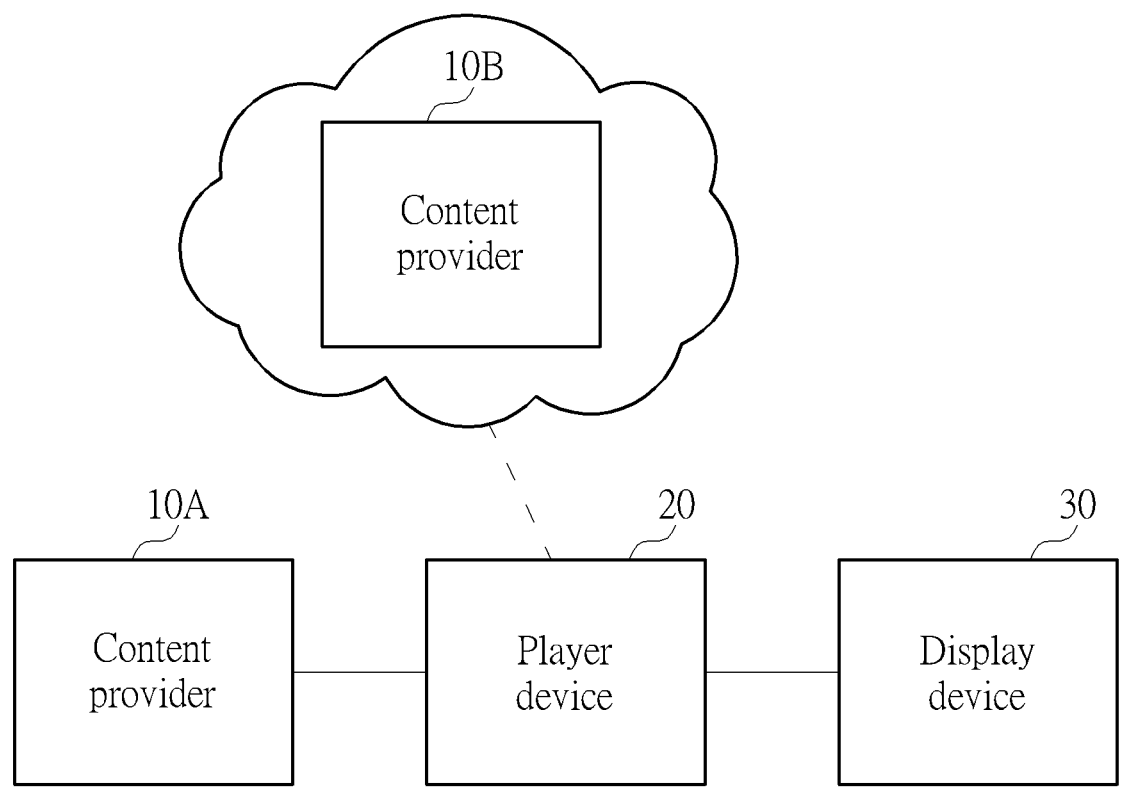
FIG. 1 illustrates a block diagram of a playing system according to an embodiment of the present invention.

FIG. 1 illustrates a block diagram of a playing system according to an embodiment of the present invention, wherein the playing system may include a content provider 10A and/or a content provider 10B, a player device 20, and a display device 30. The content providers 10A and 10B are sources of a multi-media signal of the playing system, wherein the content provider 10A may be coupled to the player device 20 through a wired method (e.g., a transmission wire or a network wire), and a wireless connection may be established between the content provider 10B and the player device 20 through a wireless method (e.g., a wireless network). In this embodiment, the content providers 10A or 10B may be a multi-media content transmitting platform, a multi-media streaming service provider platform, or a mobile device (e.g., a cellphone or a tablet), but the present invention is not limited thereto.

In this embodiment, the multi-media signal may be an image signal, an audio signal, or a video signal. The player device 20 may be, but is not limited to: a mobile device (e.g., a cellphone or a tablet), a personal computer (e.g., a desktop computer or a laptop computer), a set-top box (STB), and a compact disc (CD)/digital versatile disc (DVD) player device, or other devices capable of receiving and playing the image signal, the audio signal or the video signal. The display device 30 may be arranged to display the multi-media signal, and may be, but is not limited to: a display panel, a screen, and a digital television (TV).

It should be noted that FIG. 1 is a block diagram of a simplified playing system where only components related to the present invention are illustrated. Those skilled in the art can understand that the playing system may include other components not shown in FIG. 1 to implement functions of displaying or playing the image signal, the audio signal, or the video signal.

In this embodiment, in order to provide a user with a better experience, the player device 20 may include a signal processing device that can perform suitable processing according to a received signal (e.g. the multi-media signal from the content provider 10A and/or the content provider 10B), to further improve playing quality of the multi-media signal played or provided by the player device 20.

Figure 2:
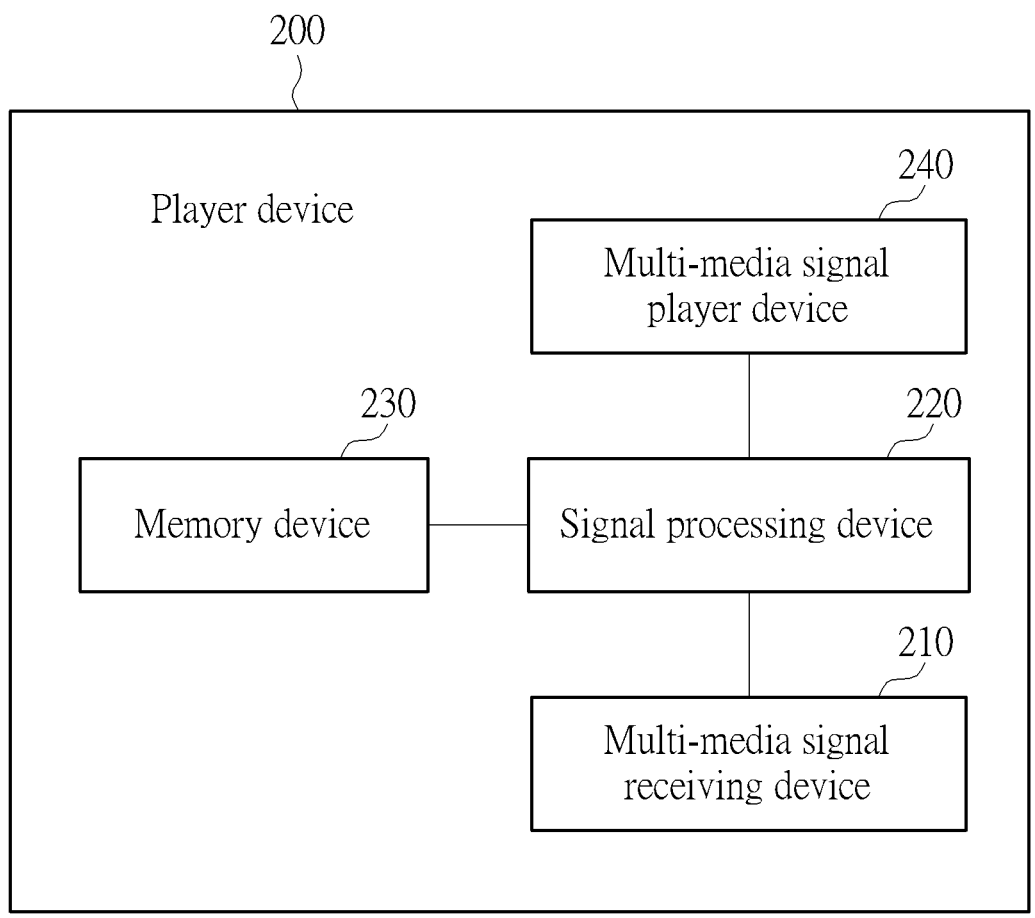
FIG. 2 illustrates a block diagram of an example of a player device according to an embodiment of the present invention.

FIG. 2 illustrates a block diagram of an example of a player device 200 according to an embodiment of the present invention, wherein the player device 20 shown in FIG. 1 may be implemented by the player device 200, and the player device 200 may include a multi-media signal receiving device 210, a signal processing device 220, a memory device 230, and a multi-media signal player device 240. The multi-media signal receiving device 210 may be arranged to receive the multi-media signal from the content provider 10A and/or the content provider 10B. The signal processing device 220 may be a processor, and may be arranged to process the multi-media signal. In this embodiment, the signal processing device 220 may further include one or more signal processing modules, signal processing units, or signal processing circuits, to perform various signal processing on the multi-media signal. For brevity, the signal processing modules, the signal processing units, or the signal processing circuits with different functions will not be deliberately distinguished, and the signal processing device 220 will act as a representative for performing the various signal processing.

The memory device 230 may provide the signal processing device 220 with storage space, to support the signal processing. The multi-media signal player device 240 may be arranged to directly play the processed multi-media signal, or transmit the processed multi-media signal to the display device 30 for the display device to display the processed multi-media signal.

Figure 3:
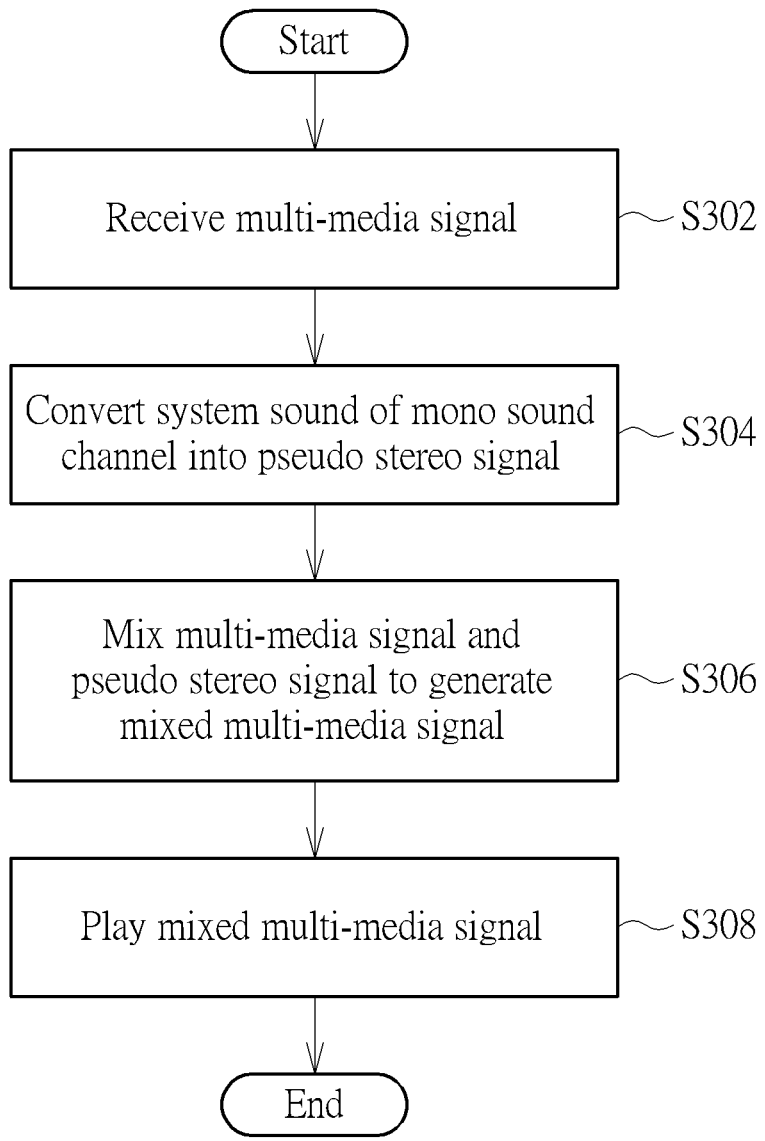
FIG. 3 illustrates a flow chart of an example of a signal processing method according to an embodiment of the present invention.

FIG. 3 illustrates a flow chart of an example of a signal processing method according to an embodiment of the present invention. The signal processing method may be arranged to generate a mixed multi-sound channel signal, and may include Steps S302-S308 executed by the player device.

In Step S302, a multi-media signal to be played is received from a content provider (e.g., the content provider 10A or 10B) by the multi-media signal receiving device 210. In this embodiment, the multi-media signal is a multi-sound channel signal, and at least includes a multi-media sound component of a first sound channel and a multi-media sound component of a second sound channel. For example, the multi-media signal may include a multi-media sound component of a left sound channel and a multi-media sound component of a right sound channel, but the present invention is not limited thereto.

In Step S304, a stereo conversion operation is performed by the signal processing device 220, to convert a mono sound channel signal of a system sound into a pseudo stereo signal.

In Step S306, a mixing operation is performed by the signal processing device 220, to mix the multi-media signal and the pseudo stereo signal to generate a mixed multi-media signal, wherein the mixed multi-media signal may be a representation of the above-mentioned mixed multi-sound channel signal.

In Step S308, the mixed multi-media signal is received and played by the multi-media signal player device 240, wherein the multi-media signal player device 240 may directly play the mixed multi-media signal, or output the mixed multi-media signal to the display device 30 (e.g., according to a predetermined transmission protocol), to play the mixed multi-media signal on the display device 30.

In this embodiment, in the stereo conversion operation, the signal processing device 220 may further perform operations (A-1), (A-2), and (A-3).

In the operation (A-1), at least one frequency component of the system sound is selected as a modulation signal.

In the operation (A-2), the modulation signal is delayed to generate a delayed modulation signal.

In the operation (A-3), the delayed modulation signal and remaining frequency components of the system sound are combined to generate a modulated system sound, wherein the modulated system sound may at least include a system sound component of the first sound channel and a system sound component of the second sound channel.

In the mixing operation, the signal processing device 220 may further perform operations (B-1), (B-2), and (B-3).

In the operation (B-1), corresponding weighting values are applied to the system sound component of the first sound channel and the system sound component of the second sound channel, respectively.

In the operation (B-2), corresponding weighting values are applied to the multi-media sound component of the first sound channel and the multi-media sound component of the second sound channel, respectively.

In operation (B-3), the multi-media sound component of the first sound channel and the system sound component of the first sound channel are combined, and the multi-media sound component of the second sound channel and the system sound component of the second sound channel are combined, to generate the mixed multi-media signal, wherein the system sound components in the operation (B-3) are the system sound components weighted by the corresponding weighting values in the operation (B-1), and the multi-media sound components in the operation (B-3) are the multi-media sound components weighted by the corresponding weighting values in the operation (B-2).

In addition, in the operation (A-1), the signal processing device 220 may utilize a filter bank to select the at least one frequency component from the system sound as the modulation signal. Since the selected frequency component is delayed by a designed time delay amount in the operation (A-2), it can be regarded as a modulation operation.

In addition, in the operation (A-2), for the first sound channel and the second sound channel, the signal processing device 220 may apply corresponding time delay amounts to the modulation signal in a time domain, respectively, and the delayed modulation signal can differentiate the signal component corresponding to the first sound channel and the signal component corresponding to the second sound channel. In this way, the modulated system sound generated in the operation (A-3) may be a pseudo stereo signal including the signal component of the first sound channel and the signal component of the second sound channel.

In this embodiment, the system sound may include at least one of a button sound generated in response to a control operation of the player device 20 (e.g., a control button or a control interface configured by a user through the player device 20, or a control operation performed on the player device 20 by the user through a remote), an application (APP) sound generated in response to running of an APP of the player device 20, an audio description corresponding to the multi-media signal, a text-to-speech item sound generated according to a menu of the player device 20, and a channel comment sound, but the present invention is not limited thereto. In some embodiments, the system sound may further include other various sounds played by the player device 20.

Figure 4:
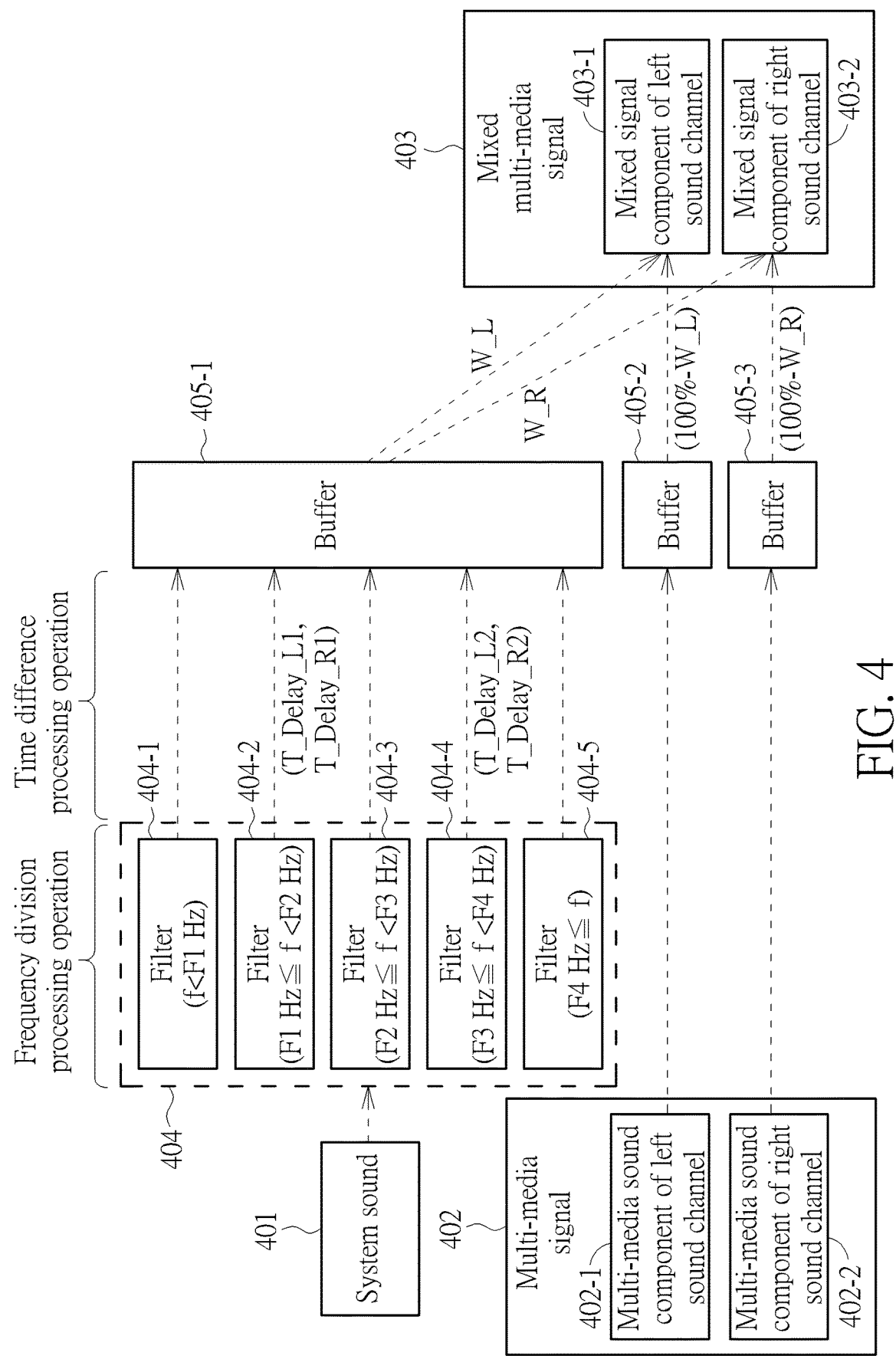
FIG. 4 illustrates a signal processing flow of a stereo conversion operation and a mixing operation according to an embodiment of the present invention.

FIG. 4 illustrates a signal processing flow of a stereo conversion operation and a mixing operation according to an embodiment of the present invention. The stereo conversion operation for converting a system sound 401 from a mono sound channel signal into a multi-sound channel signal and the mixing operation for mixing the converted system sound and a multi-media signal 402 to generate a mixed multi-media signal 403 are illustrated from left to right in FIG. 4.

The stereo conversion operation may be divided into a signal frequency division processing operation and a time difference processing operation. As shown in FIG. 4, the signal processing device 220 may utilize a filter bank 404 to perform frequency division processing on the system sound 401, to respectively extract frequency components belonging to (e.g., located in) different frequency bands. The filter bank 404 may include low pass filters, high pass filters, or band pass filters designed for different frequency bands (e.g., filters 404-1-404-5). The filter 404-1 is arranged to filter a frequency component in the system sound 401 whose frequency f is smaller than a frequency F1 in units of Hertz (Hz). The filter 404-2 is arranged to filter a frequency component in the system sound 401 whose frequency f is smaller than a frequency F2 in units of Hz and is not smaller than the frequency F1. The filter 404-3 is arranged to filter a frequency component in the system sound 401 whose frequency f is smaller than a frequency F3 in units of Hz and is not smaller than the frequency F2. The filter 404-4 is arranged to filter a frequency component in the system sound 401 whose frequency f is smaller than a frequency F4 in units of Hz and is not smaller than the frequency F3. The filter 404-5 is arranged to filter a frequency component in the system sound 401 whose frequency f is not smaller than the frequency F4. It should be noted that a configuration and the number of filters shown in FIG. 4 is for illustration only, and the present invention is not limited thereto.

The signal processing device 220 may select at least one of the multiple extracted frequency components as the modulation signal for the subsequent time difference processing operation. In this embodiment, two frequency components are selected to perform the time difference processing (e.g., the modulation), hereinafter referred to as a first modulation signal (corresponding to a frequency component output by the filter 404-2) and a second modulation signal (corresponding to a frequency component output by the filter 404-4).

In the time difference processing operation, for the first sound channel and the second sound channel, the signal processing device 220 may apply corresponding time delay amounts to the modulation signal in the time domain, respectively. In detail, a left sound channel time delay amount T_Delay_L1 and a right sound channel time delay amount T_Delay_R1 are applied to the first modulation signal, and a left sound channel time delay amount T_Delay_L2 and a right sound channel time delay amount T_Delay_R2 are applied to the second modulation signal.

The time delay amounts applied to the modulation signals for different sound channels may be the same or different. Since different time delay amounts make the user experience a more obvious stereo effect, it is better to apply different time delay amounts to the modulation signal for different sound channels. In addition, the time delay amounts applied to the modulation signals of different frequency bands (e.g., the first modulation signal and the second modulation signal) may be the same or different. For example, the same or different left sound channel time delay amounts may be applied to the modulation signals of different frequency bands, and the same or different right sound channel time delay amounts may be applied to the modulation signals of different frequency bands.

After the stereo conversion operation is completed, the signal processing device 220 may utilize a buffer 405-1 to temporarily store the remaining frequency components of the system sound, the delayed modulation signal, and the modulated system sound generated by combining the remaining frequency components of the system sound and the delayed modulation signal. As mentioned above, the modulated system sound has been converted into a pseudo stereo signal including the system sound component of the first sound channel and the system sound component of the second sound channel.

In addition, the signal processing device 220 may utilize a buffer 405-2 to temporarily store the multi-media sound component of the first sound channel in the multi-media signal 402 (e.g., a multi-media sound component 402-1 of a left sound channel shown in FIG. 4), and utilize a buffer 405-3 to temporarily store the multi-media sound component of the second sound channel in the multi-media signal 402 (e.g., a multi-media sound component 402-2 of a right sound channel shown in FIG. 4). In this embodiment, the buffers 405-1, 405-2, and 405-3 may be storage space provided by the memory device 230.

In the mixing operation, the signal processing device 220 may apply corresponding weight values (e.g., weighting values W_L and W_R shown in FIG. 4, wherein each of the weighting values W_L and W_R may be a value between 0 and 1) to the system sound component of the first sound channel and the system sound component of the second sound channel, respectively. Similarly, the signal processing device 220 may apply corresponding weight values (100%−W_L) and (100%−W_R) to the multi-media sound component of the first sound channel and the multi-media sound component of the second sound channel, respectively. After the corresponding weight values are applied, the multi-media sound component of the first sound channel and the system sound component of the first sound channel are combined to generate a mixed signal component of the first sound channel in a mixed multi-media signal 403 (e.g., a mixed signal component 403-1 of the left sound channel shown in FIG. 4), and the multi-media sound component of the second sound channel and the system sound component of the second sound channel are combined to generate a mixed signal component of the second sound channel in the mixed multi-media signal 403 (e.g., a mixed signal component 403-2 of the right sound channel shown in FIG. 4).

The weighting values for different sound channels may be the same or different. Sizes of the weight values can be flexibly adjusted according to desired effects of the playing system. As a result, the configuration of the weighting values is not a limitation to the present invention.

In the operation of generating the delayed modulation signal (e.g., the operation (A-2)), the signal processing device 220 may temporarily store the modulation signal in the memory device 230 for a predetermined time, wherein the predetermined time may be set as a time delay amount corresponding to the modulation signal. After the predetermined time expires, the signal processing device 220 may output the modulation signal temporarily stored in the memory device 230 as the delayed modulation signal, and combine the delayed modulation signal and the current remaining frequency components of the system sound, to generate the modulated system sound.

Assuming that the system sound and the multi-media signal are signals at a time t, the frequency component of the system sound selected as the modulation signal is a frequency component on a frequency band Band_1, and a time delay amount corresponding to the frequency component is Delay_1, wherein the time t may represent a specific sampling point when the system sound and the multi-media signal are digital signals. The signal processing device 220 may combine the remaining frequency components of the system sound at the current time (t) except that on the frequency band Band_1 and a frequency component belonging to the frequency band Band_1 at a time (t−Delay_1), to generate the modulated system sound. The frequency component belonging to the frequency band Band_1 at the time (t−Delay_1) is an output result of the frequency component of the frequency band Band_1 in the system sound temporarily stored in the memory device 230 for a predetermined time Delay_1, and the frequency component of the frequency band Band_1 in the system sound at the time (t−Delay_1) is the modulation signal of the system sound at the time t.

Figure 5:
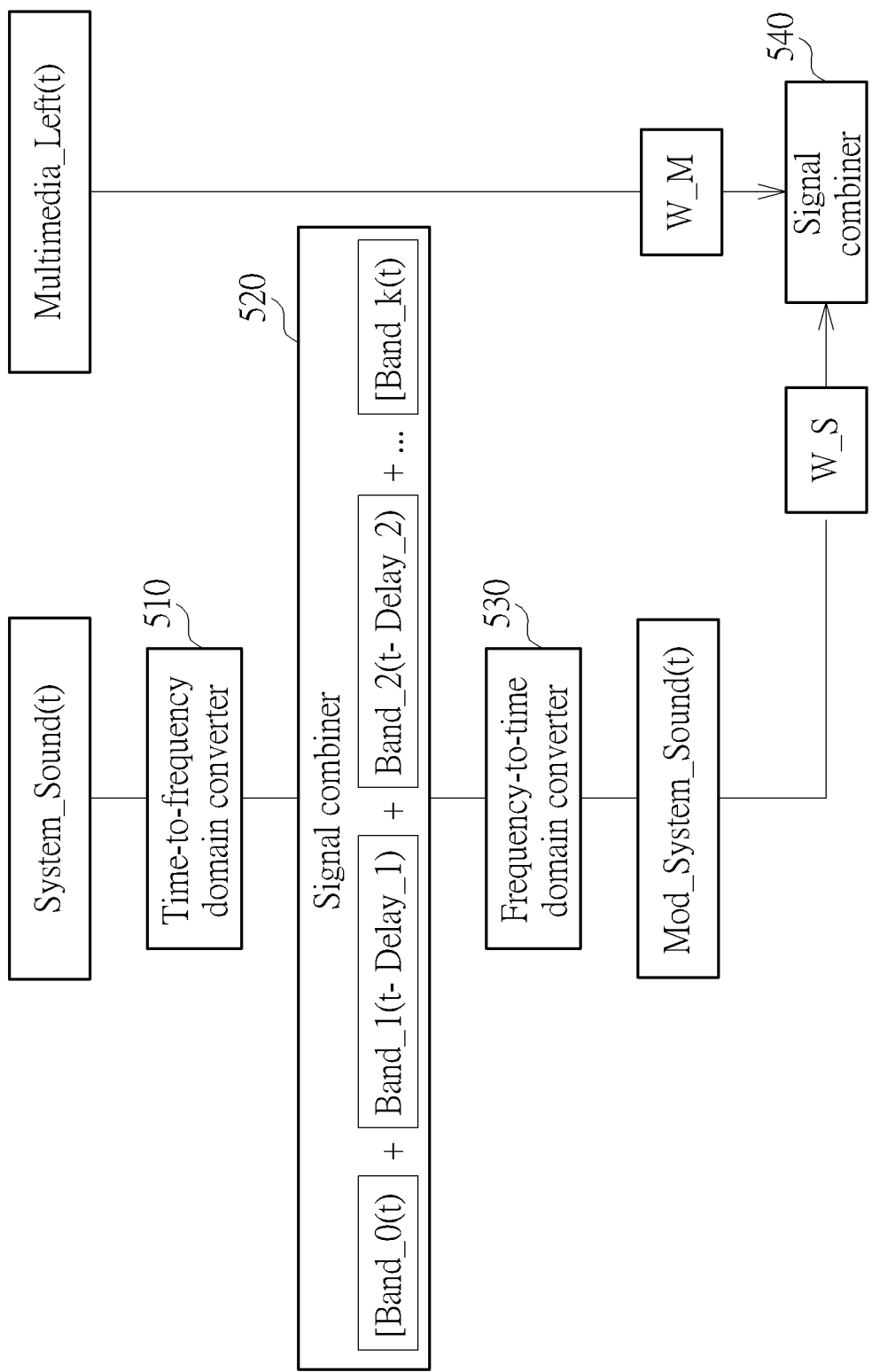
FIG. 5 illustrates a signal processing flow of a stereo conversion operation and a mixing operation according to another embodiment of the present invention.

FIG. 5 illustrates a signal processing flow of a stereo conversion operation and a mixing operation according to another embodiment of the present invention. FIG. 5 illustrates the signal delay and the signal combination in the stereo conversion operation. In addition, FIG. 5 only illustrates the signal processing flow of a single sound channel. Those skilled in the art can deduce the signal processing flow of remaining sound channels according to the content shown in FIG. 5, further descriptions are omitted here for brevity.

Assume that the system sound and the multi-media signal are signals at the time t, which are represented by a system sound System_Sound(t) and a multi-media sound component Multimedia_Left(t) of a left sound channel in FIG. 5, respectively. The system sound System_Sound(t) in the time domain is converted into a system sound in the frequency domain by a time-to-frequency domain converter 510, wherein the system sound in the frequency domain may include frequency components belonging to different frequency bands (e.g., frequency bands Band_0, Band_1, Band_2, . . . , and Band_k), and k is a positive integer greater than 0.

Assume that the frequency components selected as the modulation signals are frequency components belonging to the frequency bands Band_1 and Band_2, and the corresponding time delay amounts are Delay_1 and Delay_2, respectively. The signal processing device 220 may temporarily store the frequency component of the frequency band Band_1 (i.e., the modulation signal corresponding to the frequency band Band_1) in the memory device 230, and output the frequency component of the frequency band Band_1 after the time Delay_1 expires. Similarly, the signal processing device 220 may temporarily store the frequency component of the frequency band Band_2 (i.e., the modulation signal corresponding to the frequency band Band_2) in the memory device 230, and output the frequency component of the frequency band Band_2 after the time Delay_2 expires.

For the signal processing at the time t, a signal combiner 520 may combine the remaining frequency components of the system sound at the current time (t) except those of the frequency bands Band_1 and Band_2 with a frequency component belonging to the frequency band Band_1 at the time (t−Delay_1), and a frequency component belonging to the frequency band Band_2 at the time (t−Delay_2), such as the combination operation of [Band_0($t$)+Band_1($t$−Delay_1)+Band_2($t$−Delay_2)+ . . . Band_k(t)] shown in FIG. 5, to generate the modulated system sound.

In other words, in the signal processing at the time t, the signal combiner 520 may combine the frequency component that belongs to the frequency band Band_1 and is input at the time (t−Delay_1), the frequency component that belongs to the frequency band Band_2 and is input at the time (t−Delay_2), and the remaining frequency components input at the time t, to generate the modulated system sound. Since the time delay amounts Delay_1 and Delay_2 are the time delay amounts applied to the frequency bands Band_1 and Band_2 for the left sound channel signal, respectively, the modulated system sound may be regarded as the system sound component of the left sound channel after the system sound is converted into the pseudo stereo signal.

Afterwards, the modulated system sound in the frequency domain is converted into a modulated system sound Mod_System_Sound(t) in the time domain by a frequency-to-time domain converter 530, wherein the modulated system sound Mod_System_Sound(t) is the time-domain signal component of the left sound channel of the pseudo stereo signal. Before a final mixing operation, a weighting value W_S is applied to the modulated system sound Mod_System_Sound (t), a weighting value W_M is applied to the multi-media sound component Multimedia_Left(t) of the left sound channel, and then the modulated system sound Mod_System_Sound(t) and the multi-media sound component Multimedia_Left(t) are combined by a signal combiner 540, to generate a mixed multi-media signal, wherein each of the weighting values W_S and W_M may be a value between 0 and 1.

The time-to-frequency domain converter 510, the frequency-to-time domain converter 530, and the signal combiners 520 and 540 may be internal signal processing modules, internal signal processing units or internal signal processing circuits of the signal processing device 220. In addition, the conversion from the time domain to the frequency domain and the conversion from the frequency domain to the time domain may be implemented by different methods. For example, the above conversion may be implemented by Fast Fourier Transform (FFT)/inverse FFT (iFFT), Discrete Fourier Transform (DFT)/inverse DFT (iDFT), or Modified Discrete Cosine Transform (MDCT)/inverse MDCT (IMDCT). It should be noted that, in different implementations, in addition to conversion of the signal between the time domain and the frequency domain, an additional windowing operation (i.e., taking signals of a predetermined number of sampling points or a predetermined time length), a corresponding waveform reshaping operation, and an anti-interference operation, etc., may be needed, to repair the signal distortion caused by the windowing operation. Since the relevant operations for the conversion of the signal between the time domain and the frequency domain are well-known to those skilled in the art, further descriptions are omitted here for brevity.

In this embodiment, the time delay amount applied to the modulation signal can be flexibly adjusted according to the stereo effect desired to be generated by the playing system. For example, the time delay amount should not exceed 40 milliseconds (ms) according to the Haas effect, but the present invention is not limited thereto. In some embodiments, a time delay amount of more than 40 ms may be applied to the modulation signal (e.g., the signal processing device 220 may apply the time delay amount with 100 ms to the modulation signal).

In addition, the frequency band or the frequency component of the system sound selected as the modulation signal may be set according to the hearing range of the human ear, or may be flexibly adjusted according to the stereo effect desired to be generated by the playing system. For example, the frequency band in which the human ear is sensitive may be selected according to equal loudness contours, or the frequency band with better stereo effect may be selected according to hardware capability of the playing system (e.g., the player device 20 or the display device 30).

In summary, by the signal processing method and the player device of the present invention, the system sound and the received signal (e.g., the multi-media signal) can be processed properly, so that the playing quality of the multi-media signal provided by the player device can be effectively improved, and the user experience can be improved accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A player device, comprising:
a multi-media receiving device, arranged to receive a multi-media signal, wherein the multi-media signal is a multi-sound channel signal, and at least comprises a multi-media sound component of a first sound channel and a multi-media sound component of a second sound signal; and
a signal processing device, coupled to the multi-media receiving device, and arranged to receive the multi-media signal, and perform a mixing operation to mix the multi-media signal and a pseudo stereo signal to generate a mixed multi-media signal;
wherein the signal processing device performs a stereo conversion operation on a system sound before the mixing operation is performed, to convert the system sound into the pseudo stereo signal;
wherein in the stereo conversion operation, the signal processing device selects at least one frequency component of the system sound as a modulation signal, delays the modulation signal to generate a delayed modulation signal, and combines the delayed modulation signal and remaining frequency components of the system sound to generate the pseudo stereo signal, wherein the pseudo stereo signal at least comprises a system sound component of the first sound channel and a system sound component of the second sound channel; and
wherein in the mixing operation, the signal processing device combines the multi-media sound component of the first sound channel and the system sound component of the first sound channel and combines the multi-media sound component of the second sound signal and the system sound component of the second sound channel, to generate the mixed multi-media signal.

2. The player device of claim 1, wherein for the first sound channel and the second time channel, the signal processing device applies corresponding time delay amounts to the modulation signal in a time domain, respectively, to delay the modulation signal.

3. The player device of claim 1, wherein in the mixing operation, the signal processing device applies corresponding weighting values to the system sound component of the first sound channel and the system sound component of the second sound channel, respectively.

4. The player device of claim 1, wherein in the mixing operation, the signal processing device applies corresponding weighting values to the multi-media sound component of the first sound channel and the multi-media sound component of the second sound channel, respectively.

5. The player device of claim 1, wherein the system sound comprises at least one of a button sound generated in response to a control operation of the player device, an application sound in response to running of an application of the player device, an audio description corresponding to the multi-media signal, a text-to-speech item sound generated according to a menu of the player device, and a channel comment sound.

6. The player device of claim 1, wherein the signal processing device utilizes a filter bank to select the at least one frequency component from the system sound as the modulation signal.

7. The player device of claim 1, further comprising:
a multi-media signal player device, coupled to the signal processing device, and arranged to receive and play the mixed multi-media signal.

8. The player device of claim 1, further comprising:
a memory device, arranged to temporarily store the delayed modulation signal in the stereo conversion operation.

9. A signal processing method, arranged to generate a mixed signal of a multi-sound channel, comprising:
receiving a multi-media signal, wherein the multi-media signal is a multi-sound channel signal, and at least comprises a multi-media sound component of a first sound channel and a multi-media sound component of a second sound signal;
performing a stereo conversion operation, to convert a system sound into a pseudo stereo signal; and
performing a mixing operation, to mix the multi-media signal and the pseudo stereo signal to generate a mixed multi-media signal;
wherein in the stereo conversion operation, the signal processing method further comprises:
selecting at least one frequency component of the system sound as a modulation signal;
delaying the modulation signal to generate a delayed modulation signal; and
combining the delayed modulation signal and remaining frequency components of the system sound to generate the pseudo stereo signal, wherein the pseudo stereo signal at least comprises a system sound component of a first sound channel and a system sound component of a second sound channel;

wherein in the mixing operation, the signal processing method further comprises:

combining the multi-media sound component of the first sound channel and the system sound component of the first sound channel and combining the multi-media sound component of the second sound signal and the system sound component of the second sound channel, to generate the mixed multi-media signal.

10. The signal processing method of claim 9, wherein the step of delaying the modulation signal to generate the delayed modulation signal further comprises:

for the first sound channel and the second time channel, applying corresponding time delay amounts to the modulation signal in a time domain, respectively.

11. The signal processing method of claim 9, wherein in the mixing operation, the signal processing method further comprises:

applying corresponding weight values to the system sound component of the first sound channel and the system sound component of the second sound channel, respectively.

12. The signal processing method of claim 9, wherein in the mixing operation, the signal processing method further comprises:

applying corresponding weight values to the multi-media sound component of the first sound channel and the multi-media sound component of the second sound channel, respectively.

13. The signal processing method of claim 9, wherein the system sound comprises at least one of a button sound generated in response to a control operation of a player device, an application sound in response to running of an application of the player device, an audio description corresponding to the multi-media signal, a text-to-speech item sound generated according to a menu of the player device, and a channel comment sound.

14. The signal processing method of claim 13, further comprising:

playing the mixed multi-media signal by the player device.

15. The signal processing method of claim 9, wherein the step of delaying the modulation signal to generate the delayed modulation signal further comprises:

temporarily storing the modulation signal into a memory device for a predetermined time, and outputting the modulation signal as the delayed modulation signal after the predetermined time expires, wherein the predetermined time corresponds to a time delay amount.

* * * * *